United States Patent [19]
Arai et al.

[11] Patent Number: 6,011,130
[45] Date of Patent: Jan. 4, 2000

[54] EPOXY RESIN COMPOSITION AND PROCESS FOR PRODUCING THE SAME

[75] Inventors: Noriyuki Arai, Tokyo; Masatsugu Akiba, Osaka, both of Japan

[73] Assignee: Sumitomo Chemical Company, Limited, Osaka, Japan

[21] Appl. No.: 08/929,269

[22] Filed: Sep. 12, 1997

[30] Foreign Application Priority Data

Sep. 13, 1996 [JP] Japan ................................. 8-243203

[51] Int. Cl.[7] .................................................. C08G 59/68
[52] U.S. Cl. ................................ 528/88; 525/523; 528/94
[58] Field of Search .................... 528/88, 94; 525/523

[56] References Cited

U.S. PATENT DOCUMENTS

| | | | |
|---|---|---|---|
| 5,206,313 | 4/1993 | Ono et al. ................. | 525/524 |
| 5,414,058 | 5/1995 | Ono et al. ................. | 525/523 |

FOREIGN PATENT DOCUMENTS 2 257 143   1/1993   United Kingdom .

OTHER PUBLICATIONS

"Ordering of an epoxy resin during orientation," Korkhov, Chem Abstracts. vol. 113, No. 2, Jul. 1990.

JP 07 138502, Toto Kasei KK, "Powdery Coating Composition," Yasuyuki, Patent Abstracts of Japan, vol. 095, No. 008, Sep. 1995.

JP 63 227622, Nitto Electric Ind Co Ltd, "Epoxy Resin Powder Composition," Norio, Patent Abstracts of Japan, vol. 013, No. 024, Jan. 1989.

*Primary Examiner*—Robert Dawson
*Assistant Examiner*—D. Aylward
*Attorney, Agent, or Firm*—Pillsbury Madison & Sutro LLP

[57] ABSTRACT

Provided is an epoxy resin composition comprising a crystalline epoxy resin and an amorphous epoxy curing agent, wherein the crystalline epoxy resin is dispersing uniformly in the amorphous epoxy curing agent as crystallites. The epoxy resin composition is excellent in preservation stability.

12 Claims, No Drawings

EPOXY RESIN COMPOSITION AND PROCESS FOR PRODUCING THE SAME

BACKGROUND OF THE INVENTION

1. Field of the Invention

The present invention relates to an epoxy resin composition which is useful for adhesives, coating materials, electric and electronic materials such as insulating materials and laminated plates, particularly useful to encapsulate electronic parts, and excellent in preservation stability, and a process for producing the same.

2. Description of the Related Art

An epoxy resin is used generally as a resin composition, by being mixed with a curing agent, a cure accelerator, a filler, etc., and the composition has a problem of preservation stability. In recent years, transfer molding of an economically useful epoxy resin composition has been performed for encapsulating semiconductors, such as LSI, IC, and a transistor, and in this field, the preservation stability is especially important in view of productivity and economical efficiency.

However, the preservation stability of the conventional compositions has not been sufficient. Especially in case of using a crystalline epoxy resin, when the crystallinity is lost in a kneading process, the softening point of the composition falls remarkably, and the preservation stability is remarkably lowered. For this reason, the composition is necessary to be stored cool until just before molding. If it is left at room temperature for some time, it may become unusable.

SUMMARY OF THE INVENTION

The purpose of the present invention is to provide an epoxy resin composition excellent in preservation stability, which comprises a crystalline epoxy resin and an amorphous epoxy curing agent as indispensable components.

As a result of extensive studies, the inventors found that the dispersion state of a crystalline epoxy resin and an amorphous epoxy curing agent affects the preservation stability of the composition, and accomplished this invention.

That is, the present invention is as follows.

(1) An epoxy resin composition comprising an crystalline epoxy resin (A) and an amorphous epoxy curing agent(B), wherein the crystalline epoxy resin is dispersing uniformly in the amorphous epoxy curing agent as crystallites.

(2) An epoxy resin composition comprising a crystalline epoxy resin (A), an amorphous epoxy curing agent (B), a cure accelerator (C), and an inorganic filler (D), wherein the epoxy resin is dispersing uniformly in the amorphous epoxy curing agent as crystallites.

(3) A process for producing an epoxy resin composition characterized by that a crystalline epoxy resin (A) and an amorphous epoxy curing agent (B) are mixed uniformly at a temperature of lower than the melting point of the crystalline epoxy resin and not lower than the softening point of the amorphous epoxy curing agent, and the crystalline epoxy resin is dispersing uniformly in the amorphous epoxy curing agent as crystallites.

(4) A process for producing an epoxy resin composition characterized by that a crystalline epoxy resin (A) and an amorphous epoxy curing agent (B) are melt-mixed uniformly at a temperature of not lower than the melting point of the crystalline epoxy resin, subsequently treated at a temperature of lower than the melting point of the crystalline epoxy resin and not lower than the softening point of the amorphous epoxy curing agent, and the crystalline epoxy resin is dispersing uniformly in the amorphous epoxy curing agent as crystallites.

(5) A process for producing an epoxy resin composition characterized by that a crystalline epoxy resin (A), an amorphous epoxy curing agent (B), a cure accelerator (C), and an inorganic filler (D) are mixed uniformly at a temperature of lower than the melting point of the crystalline epoxy resin and not lower than the softening point of the amorphous epoxy curing agent, and the crystalline epoxy resin is dispersing uniformly in the amorphous epoxy curing agent as crystallites.

(6) A process for producing an epoxy resin composition characterized by that a crystalline epoxy resin (A), an amorphous epoxy curing agent (B), a cure accelerator (C) and an inorganic filler (D) are melt-mixed uniformly at a temperature of not lower than the melting point of the crystalline epoxy resin, subsequently treated at a temperature of lower than the melting point of the crystalline epoxy resin and not lower than the softening point of the amorphous epoxy curing agent, and the crystalline epoxy resin is dispersing uniformly in the amorphous epoxy curing agent as crystallites.

(7) A cured product of the epoxy resin composition of above (1) or (2).

DETAILED DESCRIPTION OF THE INVENTION

The crystalline epoxy resin which is (A) component used in this invention is not especially limited as long as it is an epoxy resin having crystallinity. Examples are those having a mesogen skelton or those having a bisphenol skelton and low molecular weight. Examples of those having a mesogen skelton include epoxy resins represented by general formula (1).

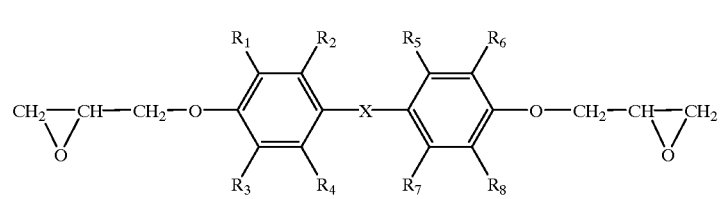

(1)

In the formula, X represents —N=N—, —CH=CH—, —O—CO—, —CH=C(CH3)—, —CH=C(CN)—, —C≡—C—, —CH=CH—CO— or a single bond. X is preferably —CH=CH—, —CH=C(CH3)—, —O—CO— or —CH=CH—CO—, and more preferably —CH=CH— and —CH=C(CH3)—.

$R_1$–$R_8$ represent each independently an alkyl group having 1–6 carbon atoms, hydrogen atom or halogen atom. Concrete examples of the alkyl group include groups such as methyl, ethyl, propyl, isopropyl, butyl, sec-butyl, tert-butyl, pentyl, hexyl and cyclohexyl. Concrete examples of a halogen atom include chlorine, bromine, etc.

As concrete examples of the epoxy resin represented by general formula (1), following compounds are included.

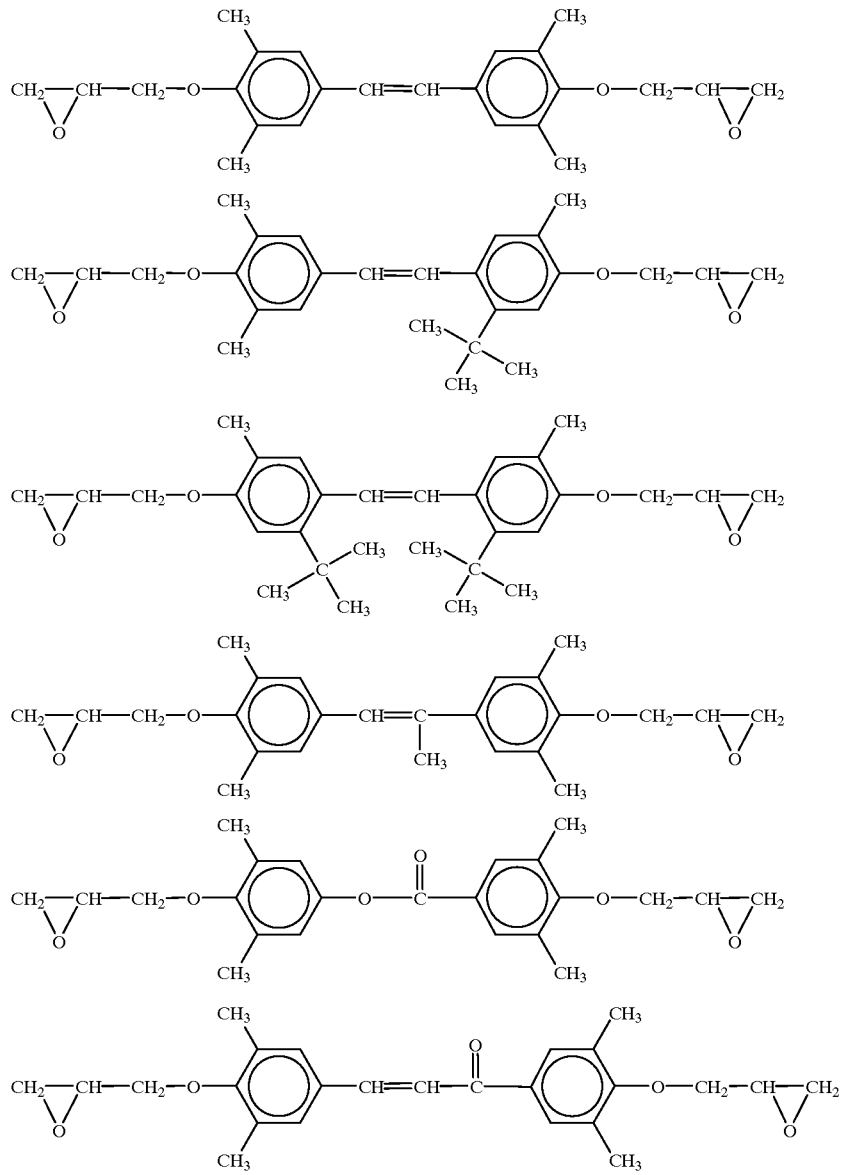

As the examples of those having a bisphenol skelton and a low molecular weight, epoxy resins represented by general formula (2) is mentioned.

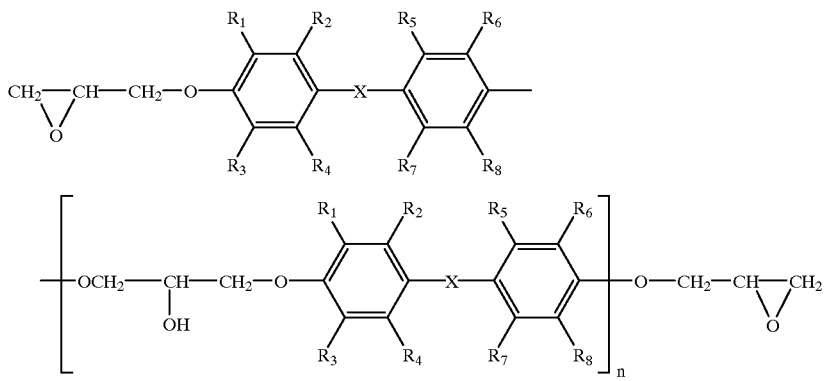

(2)

In the formula, X represents —$CH_2$—, —$C(CH_3)_2$— or —$SO_2$—. $R_1$–$R_8$ represent each independently an alkyl group having 1–6 carbon atoms, hydrogen atom or a halogen atom. n represents a numeral not higher than 0.05.

In general formula (2), examples of the alkyl group of the $R_1$–$R_8$ having 1–6 carbon atoms and a halogen atom, include the same as the those of general formula (1).

As the concrete example of an epoxy resin represented by general formula (2), low molecular weight epoxy resins such as diglycidyl ethers of bisphenol A, bisphenol S, and bisphenol F, and the epoxy resins consisting of monomers in an amount of 95% or more of them. These epoxy resins can be used alone or a mixture thereof. Melting point of these epoxy resins is preferably 80–150° C. in view of a handling property.

Although the curing agent which is the component (B) used in this invention is not limited as long as it is amorphous, preferably it is solid-like at a room temperature, and the softening point is 100° C. or lower. Concrete examples of the curing agent include: polyphenolic and the polynaphtholic novolak resins which are the reaction products of phenols such as phenol, o-cresol and catechol, or naphthols such as hydroxynaphthalene and dihydroxynaphthalene, with aldehydes such as formaldehyde; trityl skelton containing polyphenols obtained by the condensation of phenols such as phenol, cresol and methyl-t-butyl phenol, with aromatic aldehydes such as hydroxy benzaldehyde. Trityl skelton containing polyphenol novolaks which are the reaction product of trityl skelton containing poly phenols with formaldehyde; polyaralkyl phenol resins and polyaralkyl naphthol resins which are reaction products of phenols such as phenol, o-cresol and catechol, or naphthols such as hydroxy naphthalene and dihydroxy naphthalene, with xylylene dichloride and bis (hydroxymethyl)benzene; alicyclic hydrocarbon containing polyphenol resins and the polynaphthol resins which are the reaction product of phenols such as phenol, o-cresol and catechol, or naphthols such as hydroxynaphthalene, dihydroxynaphthalene, with unsaturated alicyclic hydrocarbons such as dicyclopentadiene and limonene; alicyclic hydrocarbon containing polyphenol novolak resins and the polynaphthol novolak resins which are the reaction product of alicyclic hydrocarbon containing polyphenol resins, or poly naphthol resins, with formaldehyde.

Examples of a cure accelerator which is the component (C) used in the present invention include; organic phosphine compounds, for example, triphenyl phosphine, tri-4-methyhphenyl phosphine, tri-4-methoxyphenyl phosphine, tributyl phosphine, trioctyl phosphine, tri-2-cyanoethyl phosphine, and tetra phenyl borate salts thereof; tertiary amines such as tributyl amine, triethyl amine, 1,8-diazabicyclo(5,4,0)undecene-7 and triamylamine; quarternary ammonium salts such as benzylchloride trimethyl ammonium, benzylhydroxide trimethyl ammonium, and triethyl ammonium tetraphenylborate; and imidazoles. Among these, organic phosphine compounds, 1,8-diazabicyclo(5,4, 0) undecene-7, and imidazoles are preferable from the point of moisture resistance and curability. Especially triphenyl phosphine is preferable.

Examples of the inorganic filler which is the component (D) used in the present invention include; silica, alumina, titanium white, aluminium hydroxide, talc, clay and glass fiber.

In the epoxy resin composition of the present invention, the ratio of the epoxy group of the crystalline epoxy resin (A) to the functional group of the amorphous epoxy curing agent (B) is in the range of 0.5–1.5. The ratio outside the above range may result in insufficient heat resistance of the epoxy resin composition. The ratio is preferably in the range of 0.8–1.2

The cure accelerator (C) can be used optionally in an amount as desired. However, the component (C) is preferably used so as to make the gel-time of the epoxy resin composition 10 to 180 seconds at 150–230° C., especially for use the composition as an encapsulating material.

The inorganic filler (D) is used in an amount of 10–96% by weight, preferably 70–90% by weight, in the total amount of the epoxy resin composition.

In the epoxy resin composition of the present invention, mold releasing agents such as a natural wax, a synthetic wax, a higher fatty acid and its metal salts and paraffin, colorants like carbon black, surface treatment agents such as a silane coupling agent, can be added.

As for the process for producing the epoxy resin composition of the present invention, it is not limited especially as long as the crystalline epoxy resin is dispersed as a shape of a crystallite in an amorphous curing agent. The method includes mixing in molten state, and mixing in a solvent. Practically, the former is preferable and will be explained in detail below.

The temperature at the time of mixing is important for obtaining the epoxy resin composition of the present invention by melt mixing. As one method, it includes the method of heating the mixture of a crystalline epoxy resin and an amorphous curing agent (additives such as a cure accelerator and inorganic filler can be added further, if necessary) at a temperature of lower than the melting point of the crystalline epoxy resin and not lower than the softening point of the amorphous curing agent. The temperature is preferably 10° C.–30° C. lower than the melting point of the crystalline epoxy resin. At a temperature higher than the melting point of the crystalline epoxy resin, the rate to which a crystalline epoxy resin exists in a curing agent as crystallites becomes low and it is not preferable. Moreover, at a temperature lower than the softening point of the amorphous curing agent, it needs great energy for kneading, and it is disadvantageous industrially.

On the other hand, mixtures of the crystalline epoxy resin and the amorphous curing agent can be mixed with heating at a temperature of not lower than the melting point of a crystalline epoxy resin to produce a resin composition having an uniform phase structure where both the crystalline epoxy resin and the amorphous curing agent are melt-mixed uniformly. And then, the mixture can be melt kneaded at a temperature of lower than the melting point of a crystalline epoxy resin and not lower than the softening point of an amorphous curing agent to disperse the crystallite of a crystalline epoxy resin uniformly in the curing agent. The temperature here is preferably 20 to 30° C. lower than the melting point of the crystalline epoxy resin.

For these manufacture methods, a kneading mixer, a twin-roller, an extruder, etc. can be used.

In the resin composition of the present invention comprising a crystalline epoxy resin and an amorphous epoxy curing agent, the crystalline epoxy resin is dispersing as a shape of crystallites in an amorphous curing agent, and the reaction of the curing agent with an epoxy resin during the storage is prevented and the preservation stability is raised. Here, the epoxy resin must be dispersed in an amorphous curing agent uniformly. If the dispersion is ill-balanced, partial unevenness of the performance is generated and it is not preferable. The size of the crystallite is preferably 100 $\mu$m or less, and more preferably 50 $\mu$m or less. When the size of crystallite becomes larger than 100 $\mu$m, partial unevenness of the performance is generated, or the melting property of the crystallite deteriorates in molding and curing, and molding property becomes poor.

One method of confirming the dispersion state of the crystallite of the epoxy resin in the resin composition of the present invention includes the observation by a polarizing microscope.

The epoxy resin composition of the present invention can be molded and heat-cured by a known method.

The epoxy resin composition of the present invention is used for electronic or electric use such as insulating materials and laminated plates, and for adhesives and coating materials.

PREFERRED EMBODIMENTS OF THE INVENTION

Examples of the present invention will be shown below, but the present invention is not limited to these.

REFERENTIAL EXAMPLE 1

Synthesis of Raw Material Phenol(1)

In a 2 liter four-necked flask equipped with a thermometer, a stirrer and a condenser, 195.5 g (1.6 mol) of 2,6-xylenol (abbreviated to "26XY"), 65.7 g (0.4 mol) of 2-tertiary-butyl-5-methylphenol (abbreviated to "3M6B"), 124.5 g (1.0 mol) of chloroacetaldehyde dimethylacetal and 376 g of acetic acid were charged, stirred, dissolved and cooled to 5° C. Next, a solution of conc. sulfuric acid 122 g (1.2 mol) dissolved in acetic acid 84 g was added dropwise at 10° C. for 3 hours, and the reaction system was kept at 25° C. for 6 hours, and stirred overnight at room temperature. Next, the reaction system was cooled to 5° C., and filtrated the depositted crystal. The crystal was washed 6 times with 500 g of water, dried under reduced pressure at 40° C. for 8 hours, and a crystal was obtained.

REFERENTIAL EXAMPLE 2

Synthesis of Raw Material Phenol(2)

In a 2 liter four-necked flask equipped with a thermometer and a stirrer, 245.2 g of 48.3% sodium hydroxide aqueous solutions, and 552 g of N-methyl pyrolidone were charged and the inner atomosphere was replaced with nitrogen. Under a nitrogen sealing, the temperature of the solution was raised to 140° C. A solution of the phenol intermediate 225.6 g obtained by the referential example 1 and N-methyl pyrolidone 676 g was added dropwise at 140° C. for 1.5 hours, and kept at the said temperature for 2 hours. Then, the reaction system was cooled to 60° C. and neutralized with 226 g of conc. hydrochloric acid. After recovering the solvent under a reduced pressure, the reaction mixture was charged into 1000 g of ion-exchanged water, and the deposited crystal was filtrated. The crystal was washed 3 times with 1000 g of ion-exchanged water, and dried under reduced pressure at 80° C. for 8 hours, and a crystal was obtained.

REFERENTIAL EXAMPLE 3

A Synthesis of an Epoxy Resin

In a reaction vessel equipped with a thermometer, a stirrer, a dropping funnel and the condenser with a separation pipe, the raw material obtained in the referential example 2 was charged, and dissolved in epichlorohydrin 485.6 g and dimethyl sulfoxide 243.1 g. Keeping the inside of the reaction system at 43 torr, 61.71 g of 48.3% sodium hydroxide was continuously added dropwise at temperature 48° C. for 5 hours. In the meantime, keeping the temperature at 48° C., the azeotropically distilled epichlorohydrin and water were cooled to liquify, and the reaction was continued with returnig the organic layer to the reaction system.

After the reaction, unreacted epichlorohydrin was removed by vacuum concentration. Glycidyl ether containing a by-produced salt and dimethyl sulfoxide was dissolved in 644 g of methylisobutyl ketone, and the by-produced salt and dimethyl sulfoxide was removed by washing with water. Then, methylisobutyl ketone was distilled off under reduced pressure at 160° C. and 10 torr and the desired product was obtained. The melting point of this resin was 110° C. measured by using a differential scanning calorimeter (produced by Seiko electron Co., Ltd., SSC5000 series, DSC200) under the condition of the temperature rising rate of 10° C./min. Here, the starting point of the heat-absorption peak due to melting was made to be the melting point.

EXAMPLE 1

Preparation of an Epoxy Resin Composition

Ten grams of the crystalline epoxy resin obtained in the referential example 3, and 8 g of an aralkyl phenol novolak resin (Mitsui Toatsu Company, tradename Milex XL-4L, softening point of 62° C.) as a curing agent were mixed at 100° C. for 15 minutes in a beaker. Then, triphenyl phosphine 0.35 g was added as a cure accelerator and stirred at 100° C. for 10 seconds, and an opaque resin composition was obtained. By observing this resin composition with a polarizing microscope (XTP-11; made by Nikon), it was confirmed that crystallites of 50 micrometers or less are dispersing uniformly. The resin compositions were kept in 23° C., 40° C., and 60° C. oven for 10 days. For evaluating the preservation stability, the retention rate of the epoxy resin raw materials peak were pursued (28.9 minute: detected by a differential refractive index meter) in GPC. Results are shown in Table 1.

COMPARATIVE EXAMPLE 1

An epoxy resin and a curing agent were mixed in a same manner as Example 1 except at a temperature of 120° C. for 15 minutes. Then triphenyl phosphine 0.35 g was added and stirred at 120° C. for 10 seconds, and a transparent resin composition was obtained. By observing this resin composition with a polarizing microscope, crystallites were not observed, and it was confirmed that it is the structure where an epoxy resin and a curing agent are melt-mixed uniformly.

Preservation stability test of the resin compositions was conducted as the same manner with Example 1. Results are shown in Table 1.

TABLE 1

| | Retention rate of the epoxy resin raw materials peak (%) | | | | | |
|---|---|---|---|---|---|---|
| Preservation | Examples | | | Referential Examples | | |
| Temperature | 23° C. | 40° C. | 60° C. | 23° C. | 40° C. | 60° C. |
| Preservation Days 3 days | 99 | 63 | 37 | 91 | 58 | 21 |
| 7 days | 91 | 51 | 31 | 84 | 50 | 16 |
| 10 days | 77 | 44 | 21 | 77 | 40 | 15 |

The epoxy resin composition of the present invention is excellent in preservation stability, and it is a material advantageous for productivity and economical efficiency.

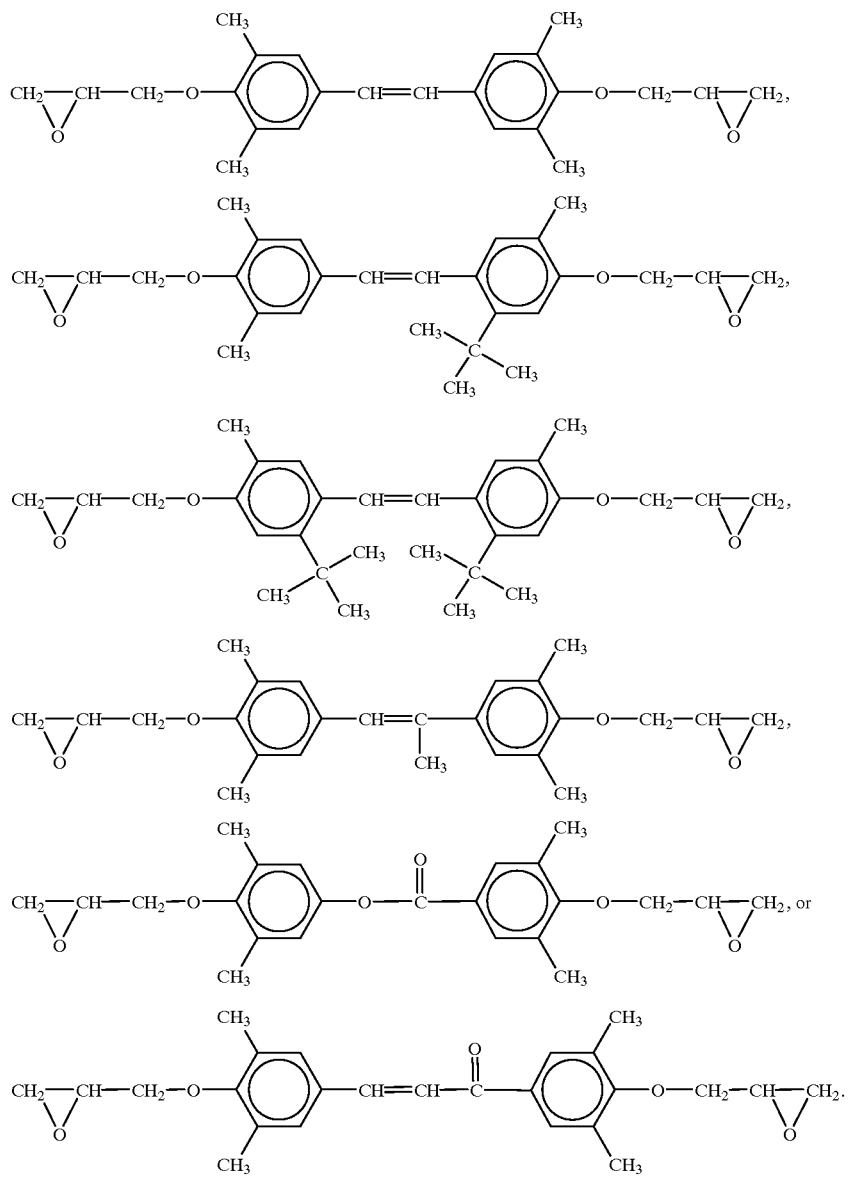
12. A process according to claim 4, wherein the epoxy resin is at least one represented from among the formulae:
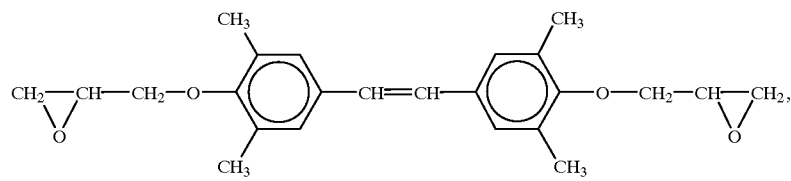

-continued
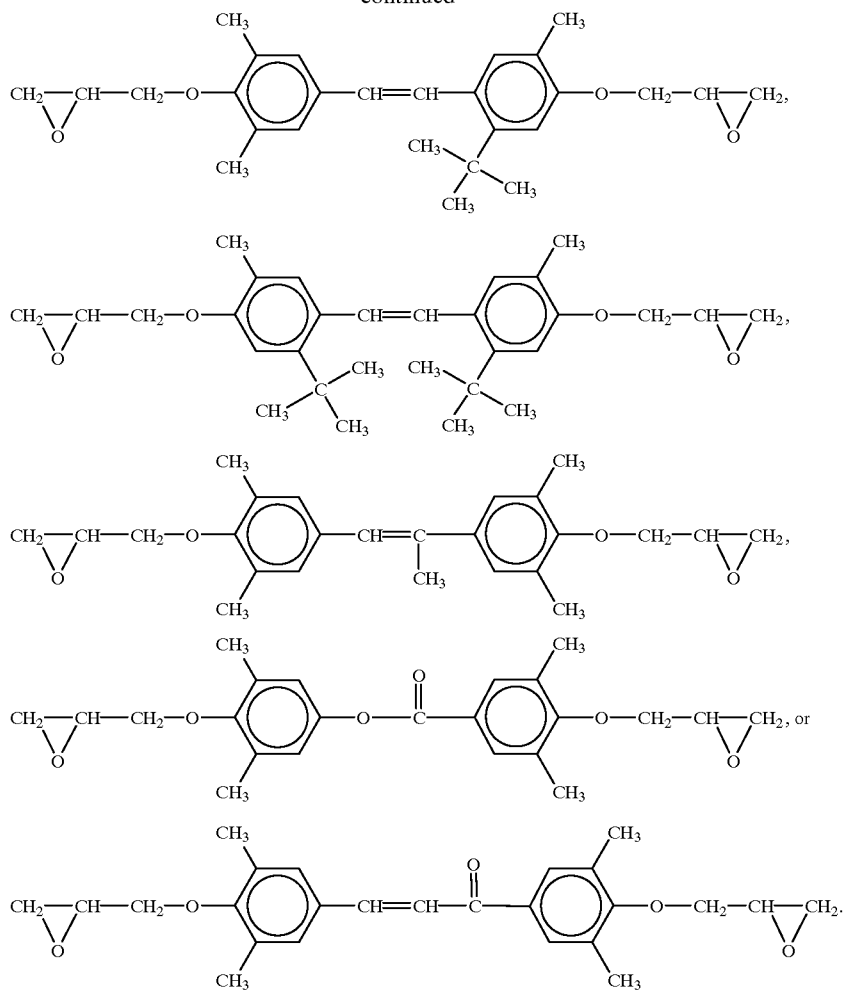

What is claimed is:

1. A process for producing an epoxy resin composition comprising:
    mixing uniformly
    (A) a crystalline epoxy resin and
    (B) an amorphous epoxy curing agent at a temperature of lower than the melting point of the crystalline epoxy resin and not lower than the softening point of the amorphous epoxy curing agent, and dispersing uniformly the crystalline epoxy resin in the amorphous epoxy curing agent as crystallites.

2. A process for producing an epoxy resin composition comprising:
    melt-mixing uniformly
    (A) a crystalline epoxy resin and
    (B) an amorphous epoxy curing agent at a temperature of not lower than the melting point of the crystalline epoxy resin with a subsequent treatment at a temperature of lower than the melting point of the crystalline epoxy resin and not lower than the softening point of the amorphous epoxy curing agent, and dispersing uniformly epoxy resin in the amorphous epoxy curing agent as crystallites.

3. A process for producing an epoxy resin composition comprising:
    mixing uniformly
    (A) a crystalline epoxy resin,
    (B) an amorphous epoxy curing agent (C) a cure accelerator, and (D) an inorganic filler at a temperature of lower than the melting point of the crystalline epoxy resin and not lower than the softening point of the amorphous epoxy curing agent, and dispersing uniformly the crystalline epoxy resin in the amorphous epoxy curing agent as crystallites.

4. A process for producing an epoxy resin composition comprising:
    melt-mixing uniformly
    (A) a crystalline epoxy resin,
    (B) an amorphous epoxy curing agent
    (C) a cure accelerator, and
    (D) an inorganic filler at a temperature of not lower than the melting point of the crystalline epoxy resin and not lower than the softening point of the amorphous epoxy curing agent, and dispersing uniformly the crystalline epoxy resin in the amorphous epoxy curing agent as crystallites.

5. A process according to claim 1, wherein the crystalline epoxy resin has a structure represented by:

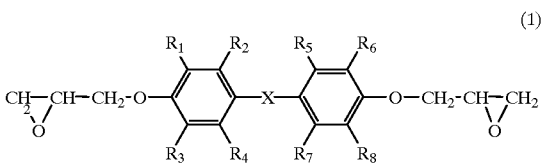

wherein formula (1), X represents —CH=CH—, —O—CO—, —CH=C(CH$_3$)—, —C≡C—, or a —CH=CH—CO—, and R$_1$-R$_8$ represent each independently an alkyl group having 1–6 carbon atoms, a hydrogen atom or a halogen atom; or

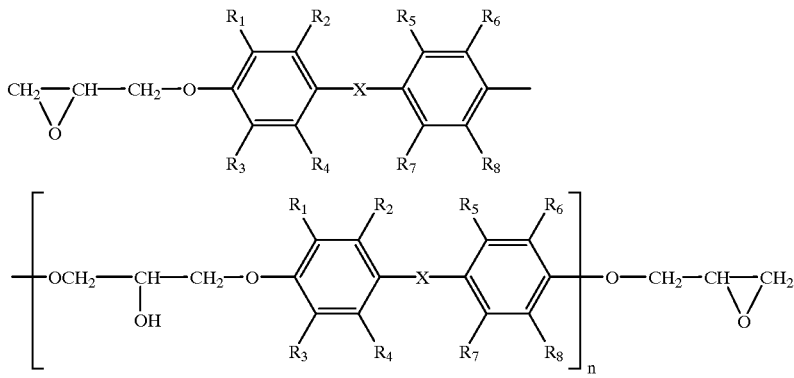

(2)

wherein formula (2), X represents —$CH_2$—, —$C(CH_3)_2$— or —$SO_2$—, $R_1$-$R_8$ represent each independently an alkyl group having 1–6 carbon atoms, a hydrogen atom or a halogen atom, and n represents a numeral not higher than 0.05.

6. A process according to claim 2, wherein the crystalline epoxy resin has a structure represented by:

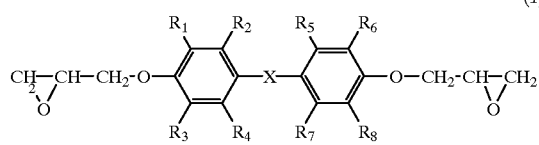

(1)

wherein the formula (1), X represents —CH—CH—, —O—CO—, —CH=C($CH_3$)—, —C≡C—, or —CH=CH—CO—, and $R_1$-$R_8$ represent each independently an alkyl group having 1–6 carbon atoms, a hydrogen atom or a halogen atom; or

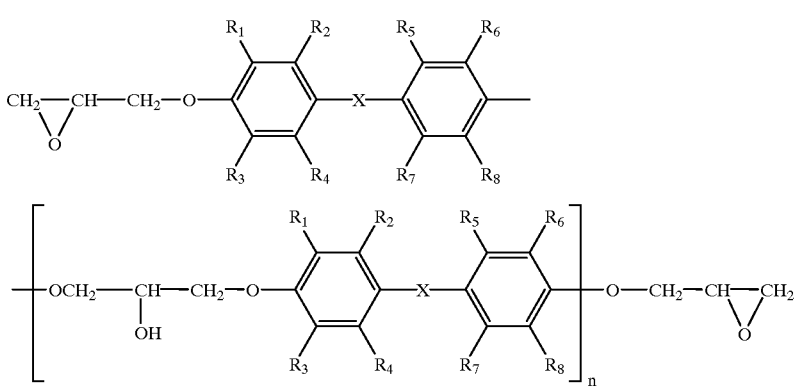

(2)

wherein formula (2), X represents —$CH_2$—, —$C(CH_3)_2$— or —$SO_2$—, $R_1$-$R_8$ represent each independently an alkyl group having 1–6 carbon atoms, hydrogen atom or a halogen atom, and n represents a numeral not higher than 0.05.

7. A process according to claim 3, wherein the crystalline epoxy resin has a structure represented by:

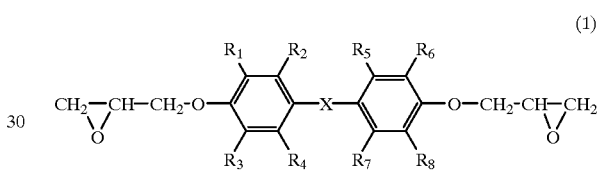

(1)

wherein the formula (1), X represents —CH—CH—, —O—CO—, —CH=C($CH_3$)—, —C≡C—, or —CH=CH—CO—, and $R_1$-$R_8$ represent each independently an alkyl group having 1–6 carbon atoms, a hydrogen atom or a halogen atom; or

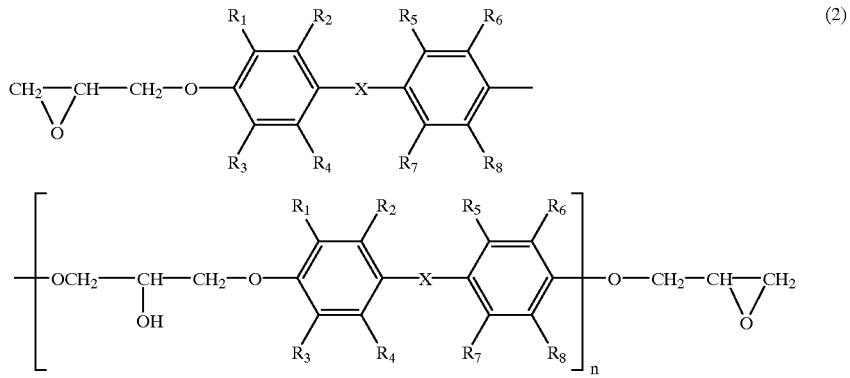

wherein formula (2), X represents —$CH_2$—, —$C(CH_3)_2$— or —$SO_2$—, $R_1$-$R_8$ represent each independently an alkyl group having 1–6 carbon atoms, a hydrogen atom or a halogen atom, and n represents a numeral not higher than 0.05.

8. Process according to claim 4, wherein the crystalline epoxy resin has a structure represented by:

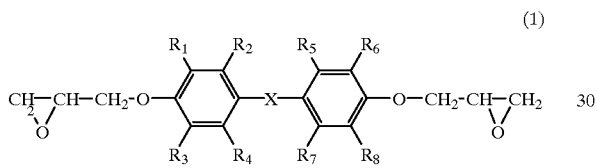

wherein formula (1), X represents —CH=CH—, —O—CO—, —CH=C($CH_3$)—, —C≡C—, or —CH=CH—CO—, and $R_1$-$R_8$ represent each independently an alkyl group having 1–6 carbon atoms, a hydrogen atom or a halogen atom; or

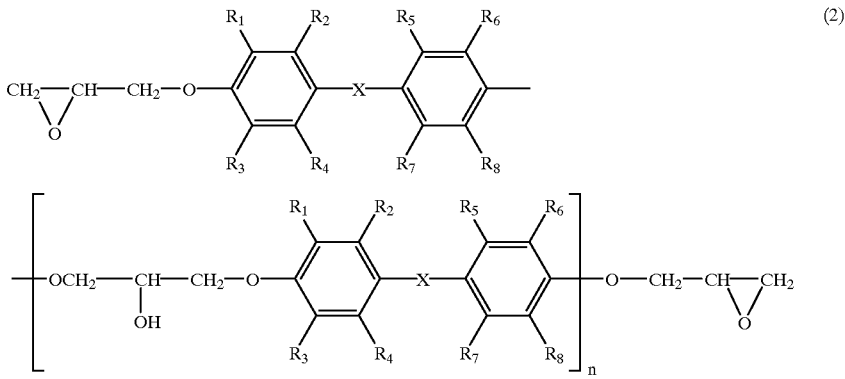

wherein formula (2), X represents —$CH_2$—, —$C(CH_3)_2$— or —$SO_2$—, $R_1$-$R_8$ represent each independently an alkyl group having 1–6 carbon atoms, a hydrogen atom or a halogen atom, and n represents a numeral not higher than 0.05.

9. A process according to claim 1, wherein the crystalline epoxy resin is at least one represented from among the formulae:

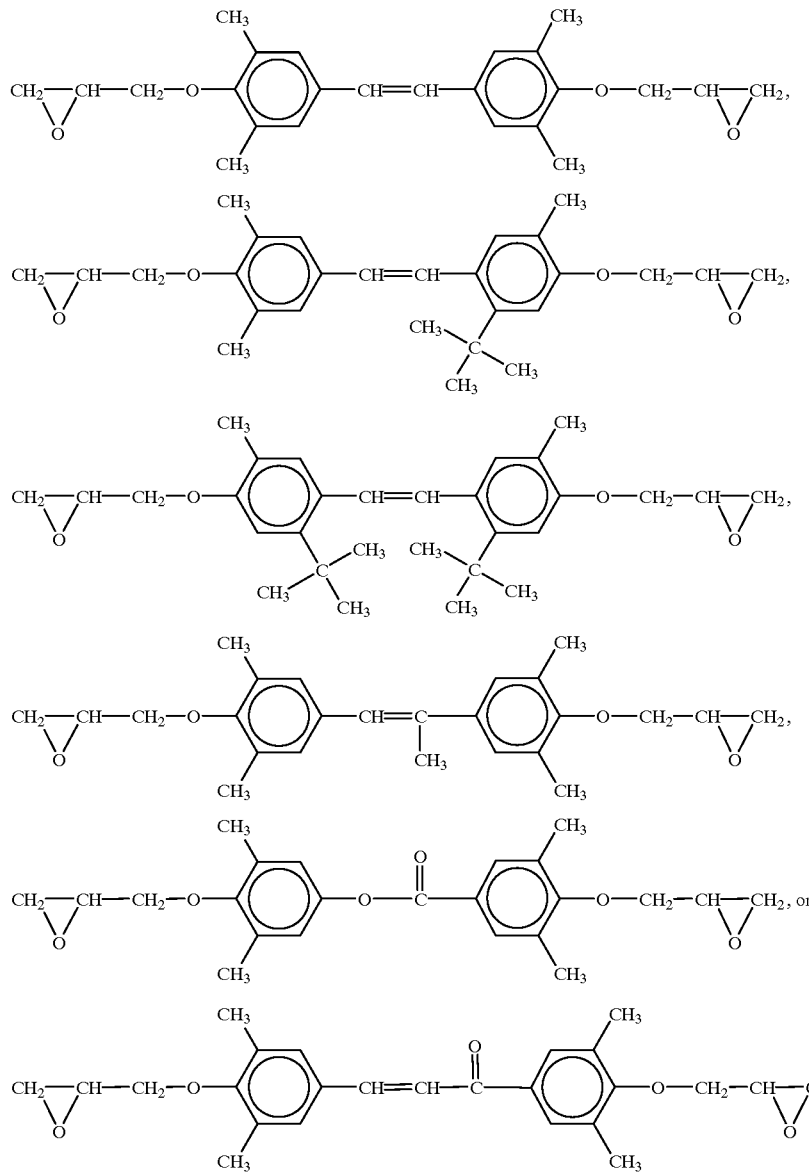
10. A process according to claim 2, wherein the crystalline epoxy resin is at least one represented from among the formulae:
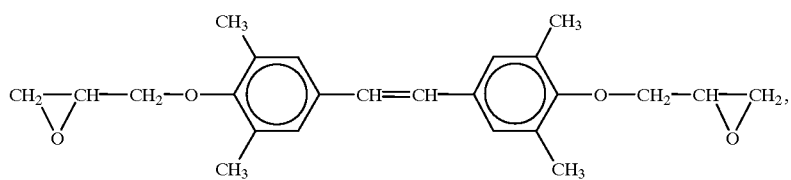

-continued
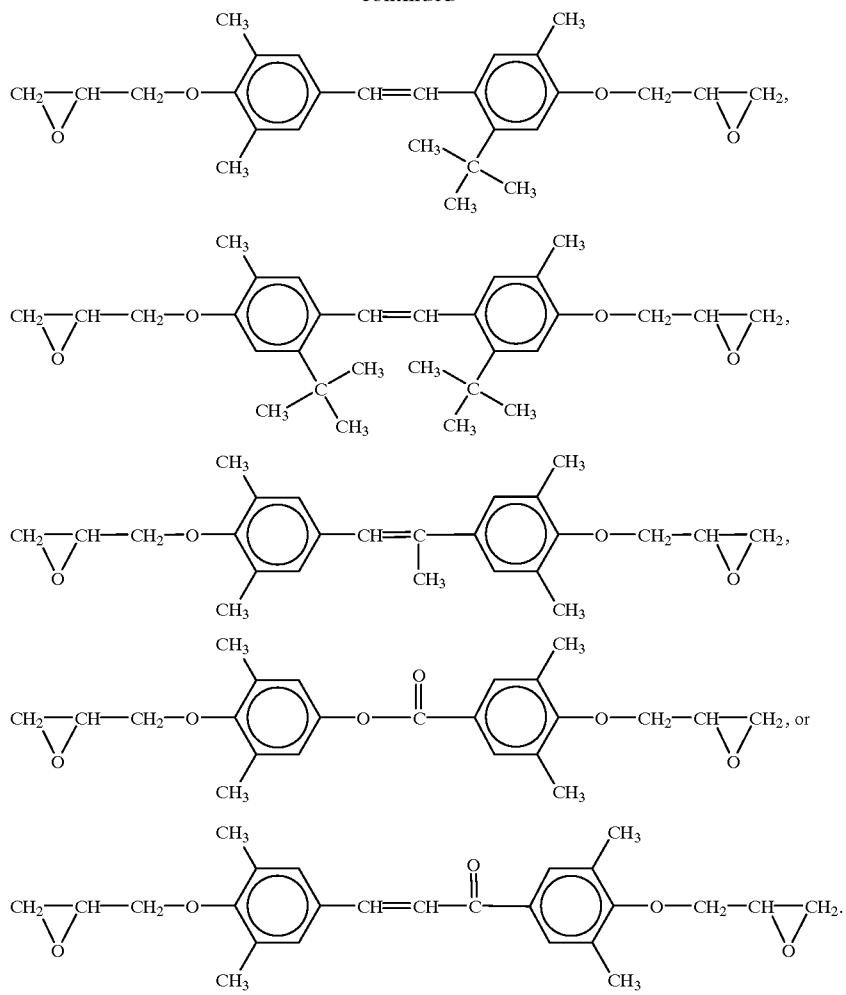
11. A process according to claim 4, wherein the crystalline epoxy resin is at least one represented from among the formulae: